(12) United States Patent
Lucas et al.

(10) Patent No.: US 11,837,758 B2
(45) Date of Patent: Dec. 5, 2023

(54) HUMIDIFICATION SYSTEM, AND FUEL CELL SYSTEM COMPRISING A HUMIDIFICATION SYSTEM

(71) Applicants: AUDI AG, Ingolstadt (DE); VOLKSWAGEN AG, Wolfsburg (DE)

(72) Inventors: Christian Lucas, Braunschweig (DE); Oliver Berger, Braunschweig (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 205 days.

(21) Appl. No.: 16/764,785

(22) PCT Filed: Oct. 1, 2018

(86) PCT No.: PCT/EP2018/076588
§ 371 (c)(1),
(2) Date: May 15, 2020

(87) PCT Pub. No.: WO2019/096481
PCT Pub. Date: May 23, 2019

(65) Prior Publication Data
US 2020/0373591 A1 Nov. 26, 2020

(30) Foreign Application Priority Data
Nov. 17, 2017 (DE) ...................... 10 2017 220 633.0

(51) Int. Cl.
*H01M 8/04119* (2016.01)
*H01M 8/04014* (2016.01)
*H01M 8/04007* (2016.01)
*H01M 8/04089* (2016.01)
*H01M 8/04223* (2016.01)

(52) U.S. Cl.
CPC ... *H01M 8/04141* (2013.01); *H01M 8/04014* (2013.01); *H01M 8/04074* (2013.01); *H01M 8/04097* (2013.01); *H01M 8/04164* (2013.01); *H01M 8/04253* (2013.01)

(58) Field of Classification Search
CPC ......... H01M 8/04126; H01M 8/04141; H01M 8/04014; H01M 8/04074; H01M 8/04097; H01M 8/04164; H01M 8/04253
See application file for complete search history.

(56) References Cited

U.S. PATENT DOCUMENTS

| | | | |
|---|---|---|---|
| 6,309,770 | B1 | 10/2001 | Nagayasu et al. |
| 6,579,637 | B1 | 6/2003 | Savage et al. |
| 2013/0004866 | A1 | 1/2013 | Gerhardt et al. |
| 2015/0086886 | A1 | 3/2015 | Blank et al. |
| 2016/0243510 | A1 | 8/2016 | Denton et al. |

FOREIGN PATENT DOCUMENTS

| | | |
|---|---|---|
| DE | 10 2004 022 245 A1 | 12/2005 |
| DE | 10 2013 003 599 A1 | 9/2014 |
| DE | 10 2014 220 501 A1 | 4/2016 |
| DE | 10 2014 223 906 A1 | 5/2016 |
| DE | 10 2015 204 620 A1 | 9/2016 |
| DE | 10 2015 220 093 A1 | 4/2017 |
| DE | 11 2016 000 888 T5 | 11/2017 |
| JP | 2008-309000 A | 12/2008 |
| JP | 2013-036640 A | 2/2013 |
| SU | 947578 A1 | 7/1982 |

OTHER PUBLICATIONS

Bauer et al., DE102014223906A machine translation (Year: 2014).*
Hiranuma et al., JP2008309000A machine translation (Year: 2008).*
Becker et al., DE102015220093A1 machine translation (Year: 2015).*
Becker et al., DE102004022245A1, machine translation (Year: 2004).*

* cited by examiner

*Primary Examiner* — Anca Eoff
(74) *Attorney, Agent, or Firm* — SEED INTELLECTUAL PROPERTY LAW GROUP LLP

(57) ABSTRACT

A humidification system for a fuel cell system is provided, comprising a feed line for supplying cathode gas which is to be or is humidified, to a heat exchanger, further comprising a liquid supply and an eddy generator, located upstream of the liquid supply, for generating eddies in the flowing cathode gas. A fuel cell system comprising a humidification system is also provided.

10 Claims, 4 Drawing Sheets

HUMIDIFICATION SYSTEM, AND FUEL CELL SYSTEM COMPRISING A HUMIDIFICATION SYSTEM

BACKGROUND

Technical Field

Embodiments of the invention relate to a humidification system for a fuel cell system. Embodiments of the invention further relate to a fuel cell system comprising a humidification system.

Description of the Related Art

To ensure the conductivity of the membrane separating the cathode from the anode within the fuel cell stack, a fuel cell should be operated with humidified gas. A humidifier is usually used for humidifying the cathode gas supplied to the cathode, in which a water vapor-permeable membrane separates the cathode gas to be humidified from the cathode exhaust gas containing the moisture.

In JP 2013/036640 A, an introduction of water on the upper side of an air humidifier is provided. This air humidifier includes spiral-shaped swirling structures in its interior, thereby swirling the air flowing from below, thereby resulting in improved moisture absorption.

The fuel cell system of U.S. Pat. No. 6,579,637 B1 comprises a swirling structure within a water separator which effects a separation of water particles in suctioned air. However, it is only used to reduce the liquid in the exhaust gas flow.

Furthermore, solutions with an injection nozzle for atomizing the water are known from DE 10 2015 220 093 A1, DE 10 2015 204 620 A1 and DE 10 2014 223 906 A1. However, the introduction of water at the top of a humidifier or the use of injection nozzles can lead to problems in a frost start of the fuel cell system due to ice formation. The injection nozzle is also formed from a plurality of components, or requires the use of further components, and is therefore very complex in terms of equipment.

US 2013/004866 A1 shows a fuel cell system in which the liquid water accumulating on the anode side is brought to the cathode side in order firstly to humidify the cathode gas flow and secondly to be able to conduct too much liquid out of the fuel cell system under the influence of gravity.

U.S. Pat. No. 6,309,770 B1 describes a solid oxide fuel cell which has anode recirculation into which a heat exchanger and a condenser and a combustion chamber are integrated.

DE 10 2013 003 599 A1 describes a further fuel cell system in which the liquid water arising on the anode side is introduced into the cathode gas on the cathode side downstream of a humidifier in order to bring about saturation of the membrane there.

SU 947 578 A1 describes an air humidifier in which, in order to protect against icing, the inflowing air is guided in a spiral-shaped wall before it enters the actual chambers of the housing. A steam tube is present in the actual chamber.

DE 11 2016 000 888 T5 describes a system for exhaust gas aftertreatment which is designed as a double-screw mixing system. A liquid supply in the form of an injection nozzle for supplying an additive is present upstream of the individual screws.

DE 10 2004 022 245 A1 describes a fuel cell system with a humidity exchange module with hollow fiber membranes. These hollow fiber membranes are combined to form a bundle, wherein a means for generating an eddy movement in the gas flow can be provided to achieve the most uniform possible incident flow on the individual hollow fiber membranes.

BRIEF SUMMARY

Embodiments of the present invention provide a humidification system which improves the input of liquid into the cathode gas. Embodiments of the present invention also provide a fuel cell system having such a humidification system.

According to embodiments of the present invention, a humidification system is provided having a feed line to supply cathode gas which is to be humidified or is humidified to a heat exchanger. A liquid supply is also provided. An eddy generator for generating swirls in the flowing cathode gas is arranged upstream of the liquid supply.

The eddy generator fluid-mechanically coupled into the feed line changes the direction of flow of the cathode gas such that it now also experiences a velocity component in the circumferential direction of the feed line. The absolute cathode gas velocity thus increases, so that a shearing force acts between the cathode gas flowing past and the liquid which is provided via the liquid supply. Because of the velocity component in the circumferential direction of the tube of the feed line, the cathode gas flows against the liquid, as a result of which it is sucked or pressed into the interior of the feed line. The transfer of the liquid into the cathode gas is improved. The relative humidity in the cathode gas is raised before entry into cathode chambers of a fuel cell stack or—if present—before entry into a humidifier, as a result of which the humidifier can then be designed smaller.

In a preferred embodiment, the heat exchanger, which is formed in particular as a charge air cooler, has an inlet nozzle or a hood arranged on the liquid supply side. Upstream of the inlet nozzle is the liquid supply and the eddy generator. Such an arrangement is advantageous because the cathode gas is supplied to the feed line by means of a compressor. Due to the compression, the incoming cathode gas is very warm, in particular at high load points of the compressor in which much liquid water is produced. Due to the elevated temperature of the cathode gas, it can absorb the liquid very well. When the liquid evaporates and is subsequently absorbed into the cathode gas, the cathode gas flow is cooled slightly, which makes it possible to use a smaller heat exchanger or charge air cooler.

Depending on the requirement, the heat exchanger in an alternative embodiment comprises an inlet nozzle or a hood connected to the feed line, the liquid supply being connected directly or directly to the inlet nozzle.

Alternatively or additionally, the inlet nozzle is arranged lower than a horizontally arranged center line of the heat exchanger. As a result, the feed line is also arranged lower, which may be necessary due to installation space requirements. In many cases, raising (i.e. in a direction opposite to the gravitational force) the liquid is not possible due to the existing risk of frost.

Another possibility for also not having to transport the liquid upwards is to connect the liquid supply to the feed line substantially in an orientation oriented vertically from below.

A further advantageous embodiment provides that the liquid supply comprises a liquid basin. Such a liquid basin prevents the liquid introduced via the liquid supply from immediately entering the heat exchanger and consequently the charge air cooler. Such accumulation of the liquid would drastically reduce the gas mass flow of the cathode gas passing through the heat exchanger. The purpose of the liquid basin is therefore that the water does not flow directly from the tube of the feed line into the heat exchanger and accumulate there. In the case of a heat exchanger, that is to say in the case of a charge air cooler, this would lead to an even lower flow velocity and thus to an even lower water discharge.

The liquid basin and/or the liquid supply can be attached directly to the feed line or also to the inlet nozzle of the heat exchanger. However, an advantageous embodiment provides that the liquid basin is formed on the feed line and/or the inlet nozzle itself. In this respect, the liquid supply can thus be designed integrally with the feed line and/or integrally with the inlet nozzle of the heat exchanger.

According to embodiments of the present invention, a fuel cell system is provided comprising a fuel cell stack having cathode chambers and anode chambers, the cathode chambers of which are connected to an inlet and an outlet of a humidifier. An anode feed line is also provided which connects a fuel storage to the anode chambers. An anode recirculation line connecting the anode outlet to the anode feed line is provided on the anode outlet side. A separator, which is preferably formed as a water separator, is assigned to the anode recirculation line. The separator is connected to the liquid supply via a liquid line. Such a fuel cell system has the advantage that the liquid collected in the separator arranged on the anode side can be used to humidify the cathode gas before it is introduced into the actual humidifier. In this context, a pre-humidification system for pre-humidifying the cathode gas can therefore simultaneously be seen in the humidification system.

In order to be able to regulate the extent of humidification of the cathode gas, it has proven to be advantageous if a liquid control element is assigned to the liquid line or is arranged therein. This liquid control element, formed as a flap or valve, can be controlled or regulated and have different degrees of opening.

In order to regulate the supplied fuel, it is expedient if a fuel control element is assigned to or arranged in the anode feed line. This fuel control element can also be formed as a valve or a flap which can be regulated or controlled and can have different degrees of opening.

In order to pre-warm the fuel supplied from the fuel storage, it has proven to be advantageous if a heat exchanger is assigned to the anode feed line between the fuel storage and the anode chambers or when such is arranged in the anode feed line. In other words, the heat exchanger is fluid-mechanically coupled into the anode feed line. This heat exchanger is preferably formed as a recuperator which supplies heat to the fuel by means of the principle of heat conduction.

BRIEF DESCRIPTION OF THE SEVERAL VIEWS OF THE DRAWINGS

Embodiments of the invention are explained in more detail below with reference to the drawings.

DETAILED DESCRIPTION

Figure 1:
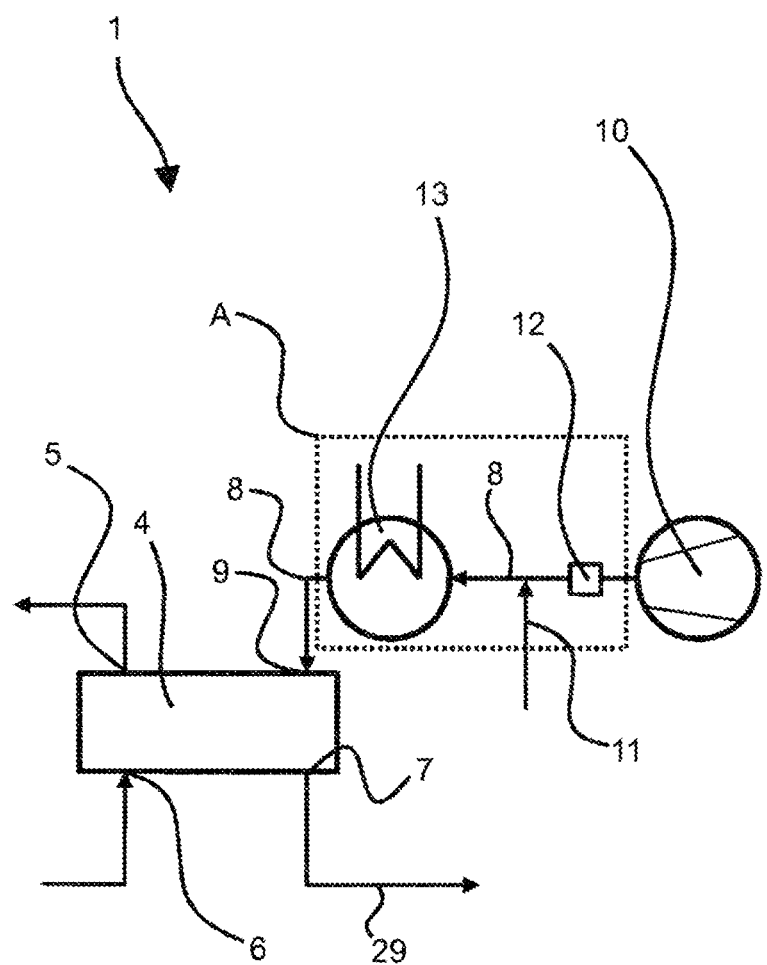
FIG. 1 is a schematic illustration of a humidification system which is connected on one end to a humidifier and on the other end to a compressor (block diagram)

FIG. 1 shows a humidification system 1 of a fuel cell system 2 which is connected only by way of example to a humidifier 4 at one end and to a compressor 10 at the other end. It is also possible to connect the humidification system 1 directly to the cathode chambers of a fuel cell stack 3. In the present case, the humidifier 4 can be connected to cathode chambers of the fuel cell stack 3 and comprises a cathode-side outlet 5 via which humidified cathode gas (for example air or oxygen) can be supplied to the cathode chambers and thus to the cathodes of the fuel cell stack 3. The humidifier 4 also has a cathode-side inlet 6 via which humidified cathode exhaust gas from the fuel cell stack 3 can be supplied to the humidifier 4. The humidifier 4 also has an exhaust gas outlet 7 connected to an exhaust gas line 29 as well as a gas inlet 9 connected to a feed line 8 for the cathode gas which is to be humidified or is already (pre-) humidified. A compressor 10 is assigned to or fluid-mechanically coupled into the feed line 8. Cathode gas is drawn in through the compressor 10, introduced into the feed line 8, and supplied to a heat exchanger 13 or the humidifier 4 in compressed form. Upstream of the heat exchanger 13 and downstream of the compressor 10, a liquid supply 11 is provided for pre-humidifying the cathode gas before it is supplied to the fuel cell stack 3 or the humidifier 4. As a result of the compression of the cathode gas by means of the compressor 10, the temperature of the cathode gas rises, so that a larger quantity of liquid can accumulate in the cathode gas.

The humidification of the cathode gas is additionally improved by an eddy generator 12 arranged upstream of the liquid supply 11, arranged in the present case between the compressor 10 and the liquid supply 11. The eddy generator 12 generates eddies in the flowing cathode gas. In other words, the cathode gas flow through the eddy generator 12 experiences a velocity component in the vertical direction or circumferential direction of the tube of the feed line 8, whereby the liquid provided by the liquid supply 11 is sheared and mixed with the cathode gas.

The cathode gas enriched with the liquid is conducted to the heat exchanger 13, in the present case to a charge air cooler, which has a compressor-side inlet 14 or a hood arranged on the compressor side. In other words, the liquid supply 11 is therefore upstream of the inlet nozzle 14 of the charge air cooler. It is also possible to arrange the liquid supply 11 on the inlet nozzle 14 or the hood of the heat exchanger 13 itself.

Figure 2:
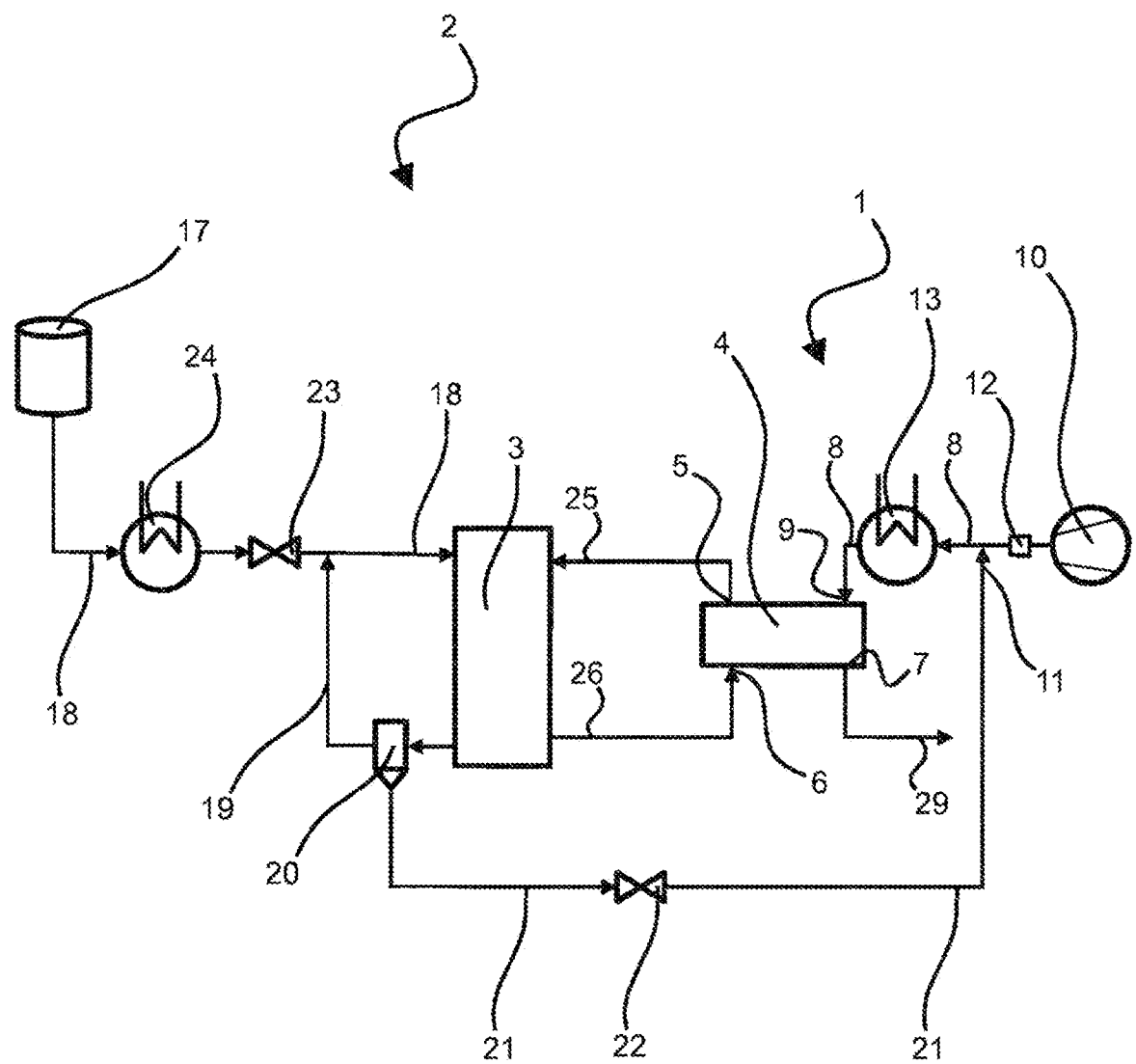
FIG. 2 is a schematic illustration of a fuel cell system with a humidification system according to FIG. 1 (block diagram)

FIG. 2 shows a fuel cell system 2 with a humidification system 1. Here the cathode-side outlet 5 of the humidifier 4 is connected via a cathode feed line 24 to cathode chambers of a fuel cell stack 3. In addition, the humidifier 4 is also connected by its cathode-side inlet 6 to the cathode chambers via a cathode exhaust gas line 26 through which unreacted cathode gas or humidified cathode exhaust gas is returned to the humidifier 4. The cathode gas is supplied via the cathode chambers to the cathodes of the plurality of fuel cells arranged in the fuel cell stack 3. Proton-conductive membranes separate the cathodes from the anodes of the fuel cells, wherein fuel (e.g., hydrogen) may be supplied to the anodes via anode chambers. For this purpose, the anode chambers are connected to a fuel storage 17 providing the fuel via an anode feed line 18. Fuel not reacted at the anodes can be recirculated to the anode chambers via an anode recirculation line 19. Preferably, a recirculation blower, not shown in greater detail, is in this case assigned to the anode recirculation or is fluid-mechanically coupled into the anode recirculation line 19. In order to regulate the supply of fuel, a fuel control element 23 is assigned to the anode feed line 18 or is arranged in the anode feed line 18. This fuel control element 23 preferably takes the form of a pressure control valve. Upstream of the pressure control valve, a heat exchanger 24 is provided, preferably in the form of a recuperator for (pre-)heating the fuel.

Disposed in the anode circuit in the present case is a separator 20, preferably a water separator, through which liquid can be collected. The drain of the separator 20 is connected to a liquid line 21 which connects the separator 20 to the liquid supply 11 of the humidification system 1. Thus, the liquid generated on the anode side is used on the cathode-side for humidification—or pre-humidification, if a humidifier 4 is used—of the cathode gas. In order to be able to adjust the quantity of liquid provided by the liquid supply 11, a liquid control element 22 is assigned to the liquid line 21 or is fluid-mechanically coupled into it. This liquid control element 22 thus enables the preferably controllable supply of the liquid from the separator 20 to the cathode circuit.

Figure 3:
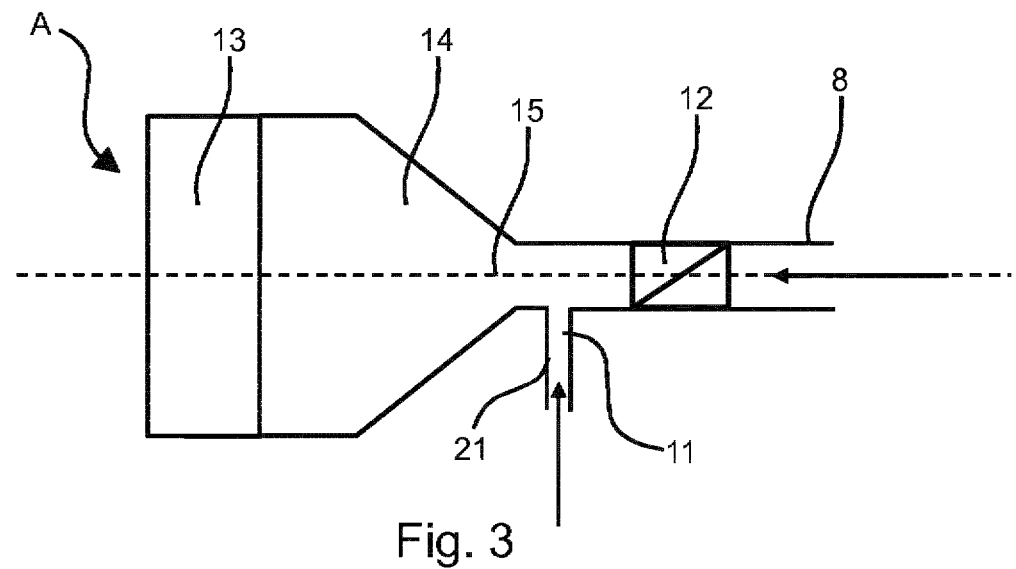
FIG. 3 is a schematic view of the detail "A" from FIG. 1 of a first humidification system.

In FIG. 3, the detail A from FIG. 1 is shown in a first humidification system 1. In this case, the inlet nozzle 14 of the heat exchanger 13, in particular of the charge air cooler, is arranged at the level of a horizontally arranged center line 15 of the heat exchanger 13. The liquid supply 11 is connected to the feed line 8 substantially in an orientation oriented vertically from below, so that no liquid drips from above into the tube of the feed line 8. Instead, the liquid provided by the liquid supply 11 is carried along by the cathode gas flowing past due to shearing forces acting between the liquid and the cathode gas. In order to increase these shearing forces, the schematically illustrated eddy generator 12 is provided upstream of the liquid supply 11. This swirls the flow of the cathode gas, so that even more liquid is carried along by the cathode gas flowing past and enters the inlet nozzle 14 of the heat exchanger 13. The humidified cathode gas is cooled in the heat exchanger 13. The cooled, humidified cathode gas may then be directed to the cathode chambers. Alternatively, however, it can also be supplied to the gas inlet 9 for cathode gas to be humidified at a humidifier 4.

Figure 4:
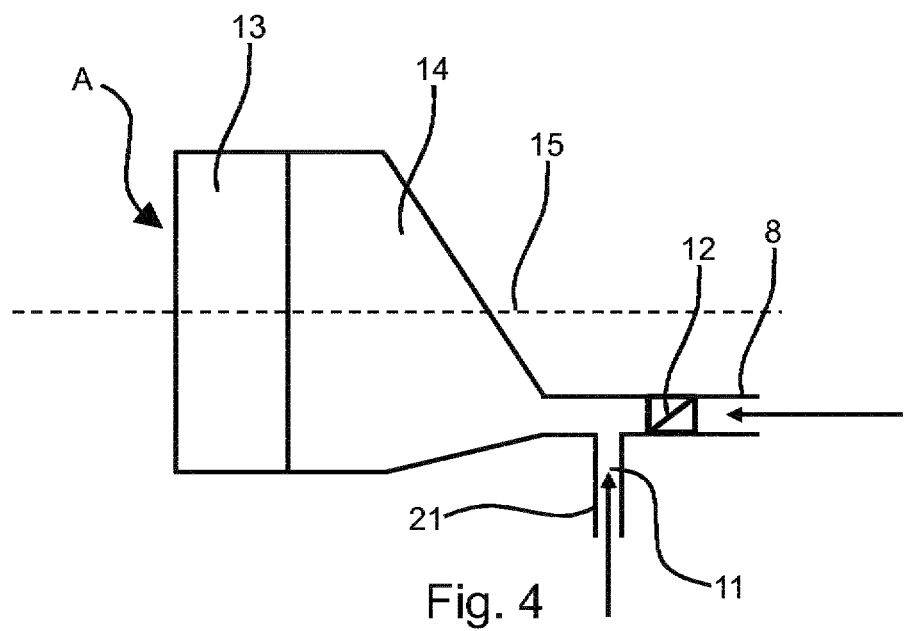
FIG. 4 is a schematic view of the detail "A" from FIG. 1 of a second humidification system.

The heat exchanger 13 or the charge air cooler according to FIG. 4 differs from those according to FIG. 3 in that the inlet nozzle 14 or its connecting piece connected to the feed line 8 is arranged lower than the horizontally arranged center line 14 of the heat exchanger 13. At the same time, the hood is correspondingly asymmetrically shaped. As a result of the lowered arrangement, the liquid of the liquid supply 11 does not have to be guided upward to such an extent, which leads to a reduction in the risk of frost. It can also be seen that the eddy generator 12 according to FIG. 4 has a smaller dimension than that of FIG. 3.

Figure 5:
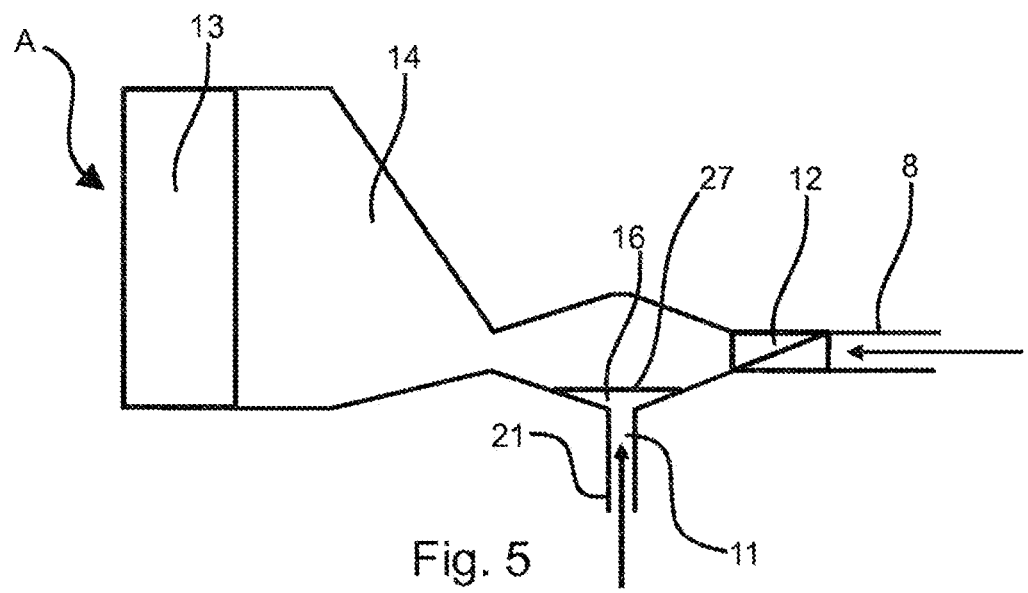
FIG. 5 is a schematic view of the detail "A" from FIG. 1 of a third humidification system.

FIG. 5 shows an alternative example of detail A in which a liquid basin 16 is assigned to the liquid supply 11. The basin is formed by a corresponding shaping of the feed line 8 so that the liquid basin 16 is formed on the feed line 8. In other words, the liquid supply 11 is thus formed integrally with the feed line 8. The liquid surface 27 past which the cathode gas flows can be increased through the use of the liquid basin 16. The fill level in the basin or the liquid surface 27 can be varied by the actuation of the liquid control element 22. The use of the liquid basin 16 also ensures that no liquid accumulates in the region of the hood of the heat exchanger 13, which would make the heat exchanger 13 more inefficient. The transition from the basin to the feed line 8 and/or the transition to the inlet nozzle 14 of the heat exchanger 13 preferably takes place without buckling, so that a correspondingly smooth transition is formed. The feed line 8 is formed in the region of the basin with a cross-section that is larger than in its remaining region, so that the cathode gas can exert the largest shear forces possible in the circumferential direction on the liquid.

Figure 6:
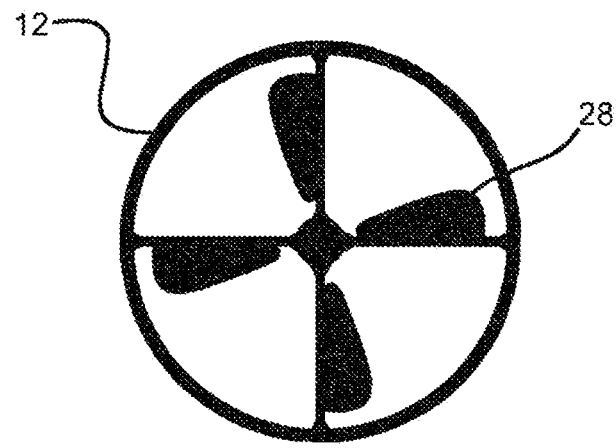
FIG. 6 is a plan view of an eddy generator.

FIG. 6 shows a plan view of an eddy generator 12, the external dimensions of which are adapted to the internal dimensions of the feed line 8. The eddy generator 12 is rigidly mounted in the tube of the feed line 8. In other words, the eddy generator 12 is formed as a stator. When the cathode gas flows past blades 28 of the eddy generator 12, the cathode gas is swirled and experiences a velocity in the circumferential direction of feed line 8. A cathode gas flow can be humidified by this arrangement.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A humidification system for a fuel cell system, comprising:
    a heat exchanger including a charge air cooler having a feed line, the feed line including a tube for supplying a flow of fresh cathode gas which is to be or is humidified to the heat exchanger;
    a liquid supply arranged upstream of the heat exchanger relative to a flow direction of the flow of fresh cathode gas, the liquid supply connected to the feed line from below and such that, in use, no liquid drips from the liquid supply into the feed line; and
    an eddy generator rigidly mounted in the tube, wherein the eddy generator includes a stator located upstream of the liquid supply relative to the flow direction of the flow of fresh cathode gas,
    wherein the eddy generator is configured to generate swirls in the flow of fresh cathode gas such that the flow of fresh cathode gas experiences a velocity component in a circumferential direction of the tube and a shearing force acts between the flow of fresh cathode gas and a liquid provided by the liquid supply.

2. The humidification system according to claim 1 wherein the heat exchanger includes an inlet nozzle arranged on the liquid supply side, and the liquid supply is upstream of the inlet nozzle.

3. The humidification system according to claim 2 wherein the inlet nozzle is arranged so as to be lower than a horizontally arranged center line of the heat exchanger.

4. The humidification system according to claim 1 wherein the heat exchanger has an inlet nozzle connected to the feed line, and the liquid supply is connected to the inlet nozzle.

5. The humidification system according to claim 1, wherein the liquid supply is connected to the feed line substantially in a vertically oriented orientation from below.

6. The humidification system according to claim 1, wherein the liquid supply comprises a liquid basin and the eddy generator is configured to generate swirls in the flow of fresh cathode gas such that the flow of fresh cathode gas experiences a velocity component in a circumferential direction of the tube and a shearing force acts between the flow of fresh cathode gas and a liquid provided in the liquid basin, resulting in evaporation of liquid into the flow of fresh cathode gas from the liquid basin.

7. The humidification system according to claim 6, wherein the liquid basin is formed on the feed line or on an inlet nozzle of the heat exchanger.

8. A fuel cell system, comprising:
   a humidification system including:
   a heat exchanger including a charge air cooler having a feed line, the feed line including a tube for supplying a flow of fresh cathode gas which is to be or is humidified to the heat exchanger;
   a liquid supply arranged upstream of the heat exchanger relative to a flow direction of the flow of fresh cathode gas, the liquid supply connected to the feed line from below and such that, in use, no liquid drips from the liquid supply into the feed line; and
   an eddy generator rigidly mounted in the tube, wherein the eddy generator includes a stator located upstream of the liquid supply relative to the flow direction of the flow of fresh cathode gas, the stator located downstream of a compressor relative to the flow direction of the flow of fresh cathode gas;
   wherein the eddy generator is configured to generate swirls in the flow of fresh cathode gas such that the flow of fresh cathode gas experiences a velocity component in the circumferential direction of the tube and a shearing force acts between the flow of fresh cathode gas and a liquid provided by the liquid supply;
   a fuel cell stack having cathode chambers and anode chambers, the cathode chambers connected to an inlet and an outlet of a humidifier;
   an anode feed line connecting the anode chambers to a fuel storage;
   an anode recirculation line; and
   a separator assigned to the anode recirculation line and to a liquid line connecting the separator to the liquid supply.

9. The fuel cell system according to claim 8 wherein a liquid control element is assigned to or arranged in the liquid line.

10. The fuel cell system according to claim 8 wherein a heat exchanger is assigned to or arranged in the anode feed line between the fuel storage and the anode chambers.

* * * * *